US008971813B2

(12) United States Patent
Callender et al.

(10) Patent No.: US 8,971,813 B2
(45) Date of Patent: Mar. 3, 2015

(54) METHOD AND APPARATUS FOR AVOIDING IN-DEVICE INTERFERENCE

(75) Inventors: Christopher Peter Callender, Hampshire (GB); Juho Mikko Pirskanen, Tampere (FI)

(73) Assignee: Broadcom Corporation, Irvine, CA (US)

( * ) Notice: Subject to any disclaimer, the term of this patent is extended or adjusted under 35 U.S.C. 154(b) by 915 days.

(21) Appl. No.: 13/094,223

(22) Filed: Apr. 26, 2011

(65) Prior Publication Data

US 2012/0276859 A1 Nov. 1, 2012

(51) Int. Cl.
*H04B 1/00* (2006.01)
*H04B 15/00* (2006.01)
*H04B 1/10* (2006.01)

(52) U.S. Cl.
CPC .............. *H04B 1/1036* (2013.01); *H04B 1/109* (2013.01)
USPC ........... 455/63.1; 455/68; 455/69; 455/67.11; 455/67.13; 455/507; 455/509; 455/515; 455/516; 455/552.1; 455/553.1; 370/445; 370/447

(58) Field of Classification Search
USPC ........ 455/418–420, 41.2, 500–502, 507, 509, 455/515–516, 550.1, 552.1, 553.1, 63.1, 455/68–69, 67.11, 67.13, 296; 370/346–350, 503–515, 445–449, 252
See application file for complete search history.

(56) References Cited

U.S. PATENT DOCUMENTS

| 7,116,938 | B2 * | 10/2006 | Monroe et al. ............... 455/41.2 |
| 7,844,222 | B2 * | 11/2010 | Grushkevich ................ 455/41.2 |
| 7,856,047 | B2 * | 12/2010 | Wang et al. ................... 375/132 |
| 8,045,533 | B2 * | 10/2011 | Hirsch .......................... 370/338 |
| 8,064,839 | B2 * | 11/2011 | Linde et al. .................. 455/63.1 |
| 8,229,364 | B2 * | 7/2012 | Linde et al. .................. 455/63.1 |
| 8,515,354 | B2 * | 8/2013 | Linde et al. .................. 455/63.1 |
| 2002/0167931 | A1 * | 11/2002 | Jang et al. ..................... 370/348 |
| 2003/0026198 | A1 * | 2/2003 | Diepstraten et al. .......... 370/208 |

(Continued)

FOREIGN PATENT DOCUMENTS

| EP | 1 389 855 A2 | 2/2004 |
| EP | 1 708 420 A1 | 10/2006 |

(Continued)

OTHER PUBLICATIONS

3GPP TR 36.816 v1.0.1(20111), Technical Report, 3$^{rd}$ Generation Partnership Project; Technical Specification Group Radio Access Networks; Evolved Universal Terrestrial Radio Access (E-UTRA); Study on Signalling and Procedure for Interference Avoidance for In-Device Coexistence; (Release 10), (2011) 38 pages.

(Continued)

*Primary Examiner* — Tuan A Tran
(74) *Attorney, Agent, or Firm* — Oblon, McClelland, Maier & Neustadt, L.L.P.

(57) ABSTRACT

A method is provided for avoiding in-device interference. The method may include determining a portion of a frequency band used for data reception by a first wireless modem that may be affected by interference from a data transmission by a second wireless modem. The method may further include causing an indication of the determined portion of the frequency band to be provided to the first wireless modem. A corresponding apparatus and computer program product are also provided.

20 Claims, 5 Drawing Sheets

(56) References Cited

U.S. PATENT DOCUMENTS

| | | |
|---|---|---|
| 2007/0080781 A1 | 4/2007 | Ginzburg et al. |
| 2009/0225717 A1 | 9/2009 | Banerjea |
| 2010/0322287 A1 | 12/2010 | Truong et al. |

FOREIGN PATENT DOCUMENTS

| | | |
|---|---|---|
| EP | 1 976 157 A2 | 10/2008 |
| GB | 2 075 308 A | 11/1981 |
| GB | 2 396 527 A | 6/2004 |
| JP | 11-205251 A | 7/1999 |
| JP | 2002-300171 A | 10/2002 |
| WO | WO 2004/045092 A1 | 5/2004 |
| WO | WO 2007/069210 A2 | 6/2007 |
| WO | WO 2007/099413 A1 | 9/2007 |

OTHER PUBLICATIONS

Search Report for Application No. GB1107066.1 dated Jun. 16, 2011.
Search Report for GB 0229833.9 dated Jun. 10, 2003.
Search Report for GB 1107066.1 dated Dec. 13, 2011.
Office Communication for Application No. GB1107066.1 dated Sep. 2, 2011.

* cited by examiner

METHOD AND APPARATUS FOR AVOIDING IN-DEVICE INTERFERENCE

TECHNOLOGICAL FIELD

Embodiments of the present invention relate generally to wireless communication technology and, more particularly, relate to an apparatus, method and computer program product for avoiding in-device interference.

BACKGROUND

The modern communications era has brought about a tremendous expansion of wireless network technology, driven by consumer demands. This expansion of wireless and mobile networking technologies have addressed related consumer demands, while providing more flexibility and immediacy of information transfer and providing convenience to users.

Concurrent with the expansion of wireless and mobile networking technologies, computing devices, such as mobile computing devices, have been developed that are configured to take advantage of modern communications networks and associated communication technologies. In this regard, computing devices may include wireless modems that enable the transmission and/or receipt of data using a respective wireless communications technology or service. Given the multitude of commonly used wireless communications technologies and services, many computing devices include multiple wireless modems.

Each wireless modem may operate in a particular radio frequency band(s) used by a respective communications technology or service implemented by the modem. However, given limited spectrum availability, frequency bands allocated for various services and communications technologies, as well as unlicensed bands, may be in close proximity to each other on the frequency spectrum, and may only be separated by very narrow guard bands. Accordingly, in-device interference may occur in devices having multiple modems operating concurrently.

BRIEF SUMMARY OF EXAMPLE EMBODIMENTS

Methods, apparatuses and computer program products are provided herein for avoiding in-device interference. Embodiments provided herein may provide several advantages to network providers, wireless service providers, computing devices, and computing device users. For example, some example embodiments may facilitate avoidance of in-device interference by informing a first modem of a portion of a frequency band used by the first modem for data reception that may be affected by interference from a data transmission by a second modem. Accordingly, the first modem may avoid interference by proactively avoiding usage of the affected portion of the frequency band or delaying data receipt.

Some example embodiments may be particularly beneficial for devices having both a cellular modem, such as a cellular modem configured for operation in accordance with Long Term Evolution (LTE) and/or LTE-Advanced (LTE-A) technologies, and a connectivity modem used for inter-device communication in an unlicensed frequency band, such as a wireless local area network (WLAN) modem and/or a Bluetooth transceiver. In this regard, the connectivity modem of such example embodiments may be informed of portions of the frequency band used for data reception that may be affected by a data transmission by the cellular modem. The logic of some such example embodiments may be integrated into a chip or chipset that may comprise or be implemented on the cellular modem. Accordingly, the connectivity modem may not be required to understand any aspects of the cellular transmission. Further, in such example embodiments, if changes are later made to the cellular protocol, neither the interface between the cellular modem and the connectivity modem nor the connectivity modem is affected, as operation of the cellular modem may be transparent to the connectivity modem. As another benefit of some such example embodiments, if improvements in radio frequency filter technology become available that may reduce leakage, calculations of the portion of the frequency band used by the connectivity modem that may be affected by data transmission by the cellular modem may be adjusted in a manner that is transparent to the connectivity modem, as the connectivity modem may be informed of the affected portion of the frequency band without having knowledge of the underlying calculations.

In a first example embodiment, a method is provided, which may comprise determining a portion of a frequency band used for data reception by a first wireless modem that may be affected by interference from a data transmission by a second wireless modem. The method of this example embodiment may further comprise causing an indication of the determined portion of the frequency band to be provided to the first wireless modem.

In another example embodiment, an apparatus comprising at least one processor and at least one memory including computer program code is provided. The at least one memory and the computer program code may be configured to, with the at least one processor, cause the apparatus of this example embodiment at least to perform determining a portion of a frequency band used for data reception by a first wireless modem that may be affected by interference from a data transmission by a second wireless modem. The at least one memory and the computer program code may be configured to, with the at least one processor, further cause the apparatus of this example embodiment to perform causing an indication of the determined portion of the frequency band to be provided to the first wireless modem.

In a further example embodiment, a computer program product comprising at least one non-transitory computer-readable storage medium having computer-readable program code instructions stored therein is provided. The computer-readable program code instructions may include program code instructions configured to determine a portion of a frequency band used for data reception by a first wireless modem that may be affected by interference from a data transmission by a second wireless modem. The program code instructions may further include program code instructions configured to cause an indication of the determined portion of the frequency band to be provided to the first wireless modem.

In yet another example embodiment, an apparatus is provided, which may comprise means for determining a portion of a frequency band used for data reception by a first wireless modem that may be affected by interference from a data transmission by a second wireless modem. The apparatus of this example embodiment may further comprise means for causing an indication of the determined portion of the frequency band to be provided to the first wireless modem.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE SEVERAL VIEWS OF THE DRAWINGS

Figure 1:
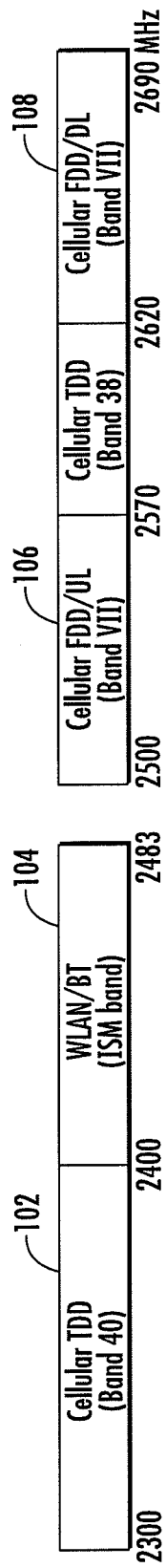
Figure 2:
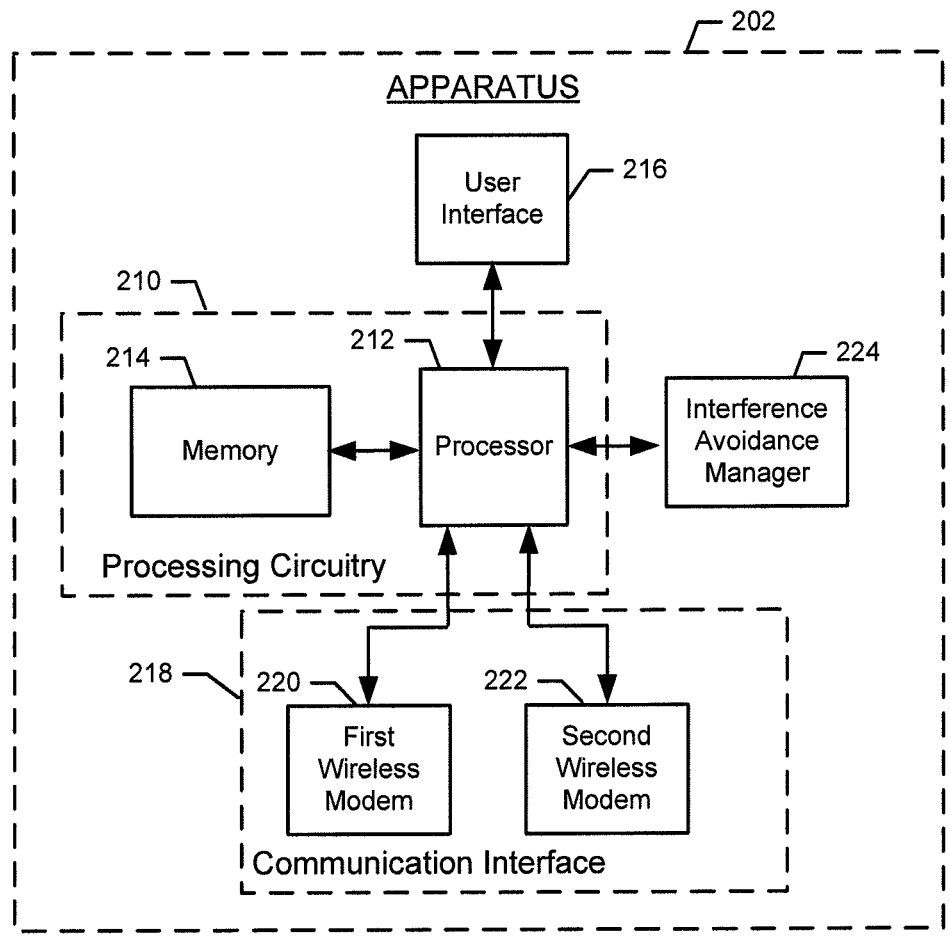
Figure 3:
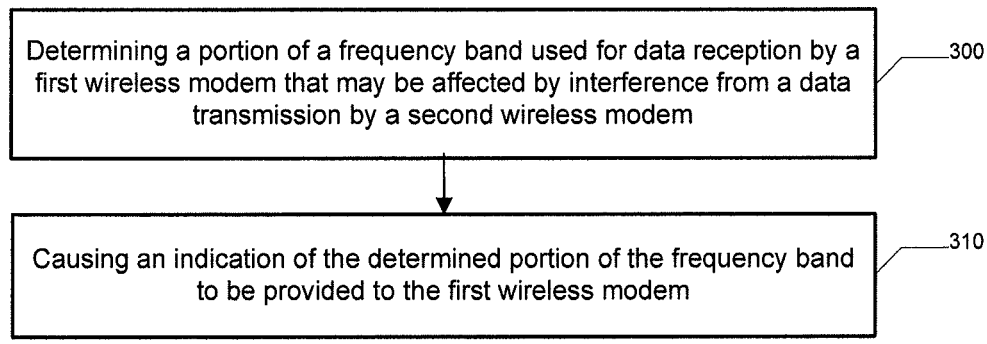
Figure 4:
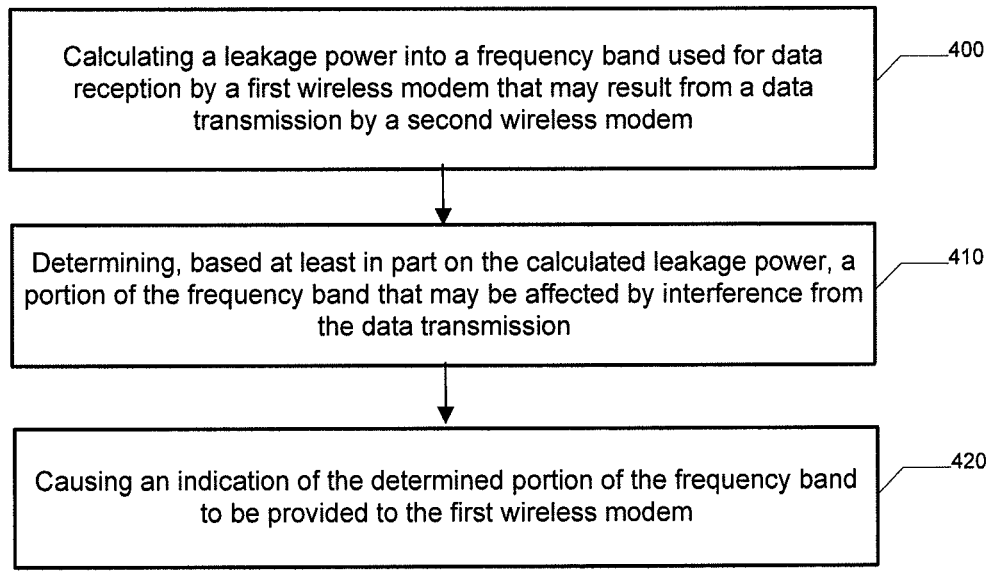
Figure 5:
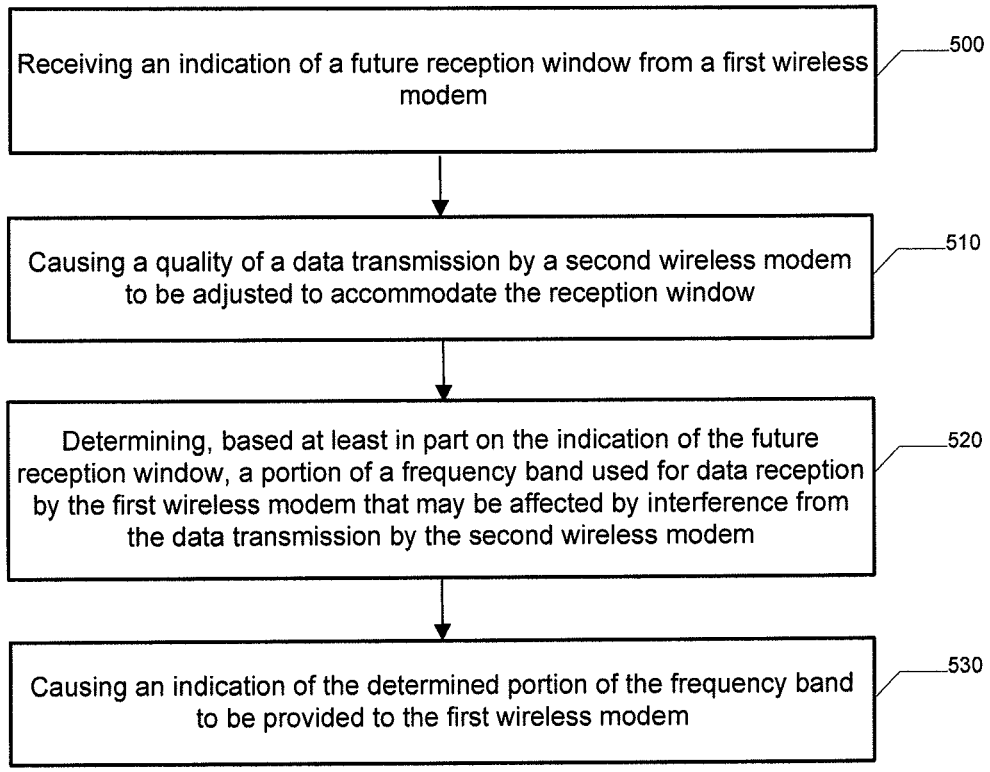

Having thus described embodiments of the invention in general terms, reference will now be made to the accompanying drawings, which are not necessarily drawn to scale, and wherein:

FIG. 1 illustrates an arrangement of frequency bands according to some example embodiments;

FIG. 2 illustrates a block diagram of an apparatus for facilitating avoidance of in-device interference in accordance with some example embodiments;

FIG. 3 illustrates a flowchart according to an example method for facilitating avoidance of in-device interference in accordance with some example embodiments;

FIG. 4 illustrates a flowchart according to another example method for facilitating avoidance of in-device interference in accordance with some example embodiments; and FIG. 5 illustrates a flowchart according to a further example method for facilitating avoidance of in-device interference according to some example embodiments.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to data capable of being transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like.

As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

In devices having a cellular modem operating in a cellular frequency band and a connectivity modem (e.g., a wireless local area network (WLAN) modem, a Bluetooth transceiver, or the like) operating in an Industrial, Scientific, Medical (ISM) band, coexistence problems may arise because Third Generation Partnership Project (3GPP) band 7 is very close to the ISM band which devices may wish to use simultaneously for WLAN or Bluetooth communication. For example, a mobile device may use a cellular connection (e.g., a Long Term Evolution (LTE), LTE-Advanced (LTE-A), or the like) for internet connectivity and may stream internet audio over a Bluetooth connection to a peripheral device. As another example, a mobile device may use a cellular connection for internet connectivity and use WLAN connectivity to provide an access point for sharing the internet connection with other WLAN equipped devices, such as laptops, game consoles, and/or the like.

Referring now to FIG. 1, FIG. 1 illustrates an example arrangement of frequency bands according to some example embodiments. As illustrated, cellular band 40 (reference 102) may be used for Time Division Duplex (TDD) cellular communications. The neighboring ISM band (reference 104) may be used for WLAN and/or Bluetooth (BT) communication. Cellular band VII (reference 106) may be used for Frequency Division Duplex (FDD)/uplink (UL) cellular transmissions. As may be seen from FIG. 1, there are potential coexistence problems due to the proximity/lack of a guard band between the ISM band (reference 104) and cellular bands VII (reference 106) and 40 (reference 102). Although not illustrated in FIG. 1, cellular/LTE band 41 (also has potential coexistence problems with ISM.

In principle in-device coexistence problems may arise because a modem in the device for example, (a cellular modem, WLAN modem, BT, transceiver, or the like) transmitting data may have some unwanted emissions in a nearby band that may be used by another modem of the device. These unwanted emissions may be present at the receive antenna for the other modem and may create a noise floor which may desensitize the receiver of the other modem. While guard bands and RF band pass filtering of the transmit signal may be used to filter the unwanted transmitter emission to a level that may allow an acceptable desensitization of the other modem's receiver, the limited amount of available radio spectrum has resulted in a lack of guard bands or a lack of guard bands sufficiently large enough to allow sufficient filtering in many instances.

Considering cellular band VII operation, there is a reasonable frequency separation between the top of the ISM band (reference 104) and the lowest frequency in the cellular FDD downlink band (reference 108). Accordingly, for transmissions in the ISM band (reference 104), the interference to a cellular user equipment receiver may be handled through use of band pass filtering. However, the same is not true for cellular transmissions, as the lowest frequency (2500 Mhz) in the cellular uplink band (reference 106) is separated by only a 17 megahertz (MHz) guard band from the highest frequency in the ISM band (2483 MHz). In this regard, it may not be feasible to design a radio frequency (RF) filter which simultaneously has both low insertion loss in the FDD UL band (necessary to achieve good talk time in device) and a very high attenuation of signals in the ISM band, due to the small frequency separation.

Example embodiments disclosed herein may address this issue by providing information from a cellular modem to a connectivity modem operating in the ISM band about pending transmissions and the impact that they may have on ISM reception. The connectivity modem may accordingly use this information and may take measures to avoid reception on portions of the ISM band (e.g., channels) that may be blocked by the cellular transmission. While some example embodiments may be described with respect to interference to a portion of the ISM band that may be caused by cellular transmissions, it will be appreciated that this description is by way of example and not by way of limitation, as example embodiments are applicable to other coexistence cases. Further, it will be appreciated that example embodiments are not limited to application to the impact of transmissions on cellular band VII (reference 106) on reception in the ISM band (reference 104). For example, some embodiments may also be applied to the impact that a transmission on cellular band 40 (reference 102) may have on reception in the ISM band (reference 104).

Referring now to FIG. 2, a block diagram of an apparatus 202 for facilitating avoidance of in-device interference in accordance with some example embodiments is illustrated. It will be appreciated that the apparatus 202 as well as the illustrations in other figures are each provided as an example of an embodiment(s) and should not be construed to narrow the scope or spirit of the disclosure in any way. In this regard, the scope of the disclosure encompasses many potential embodiments in addition to those illustrated and described herein. As such, while FIG. 2 illustrates one example of a configuration of an apparatus for facilitating avoidance of in-device interference, numerous other configurations may also be used to implement embodiments of the present invention.

The apparatus 202 may comprise or be embodied on any computing device or portion thereof. By way of non-limiting example, the apparatus 202 may be embodied as/on a desktop computer, laptop computer, mobile terminal, tablet computer, mobile phone, a game device, a digital camera/camcorder, an audio/video player, a television device, a radio receiver, a positioning device, chipset, a computing device comprising a chipset, any combination thereof, and/or the like The apparatus 202 may include or otherwise be in communication with processing circuitry 210 that is configurable to perform actions in accordance with example embodiments disclosed herein. The processing circuitry 210 may be configured to perform data processing, application execution and/or other processing and management services according to one or more example embodiments. In some embodiments, the apparatus 202 or a portion(s) or component(s) thereof, such as the processing circuitry 210, may be embodied as or comprise a chip or chip set. In other words, the apparatus 202 or the processing circuitry 210 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 202 or the processing circuitry 210 may therefore, in some cases, be configured to implement an embodiment of the invention on a single chip or as a single "system on a chip." As such, in some cases, a chip or chipset may constitute means for performing one or more operations for providing the functionalities described herein.

In some example embodiments, the processing circuitry 210 may include a processor 212 and, in some embodiments, such as that illustrated in FIG. 2, may further include memory 214. The processing circuitry 210 may be in communication with or otherwise control a user interface 216 and/or a communication interface 218. As such, the processing circuitry 210 may be embodied as a circuit chip (e.g., an integrated circuit chip) configured (e.g., with hardware, software or a combination of hardware and software) to perform operations described herein.

The user interface 216 (if implemented) may be in communication with the processing circuitry 210 to receive an indication of a user input at the user interface 216 and/or to provide an audible, visual, mechanical or other output to the user. As such, the user interface 216 may include, for example, a keyboard, a mouse, a joystick, a display, a touch screen, a microphone, a speaker, and/or other input/output mechanisms.

The communication interface 218 may include one or more interface mechanisms for enabling communication with other devices and/or networks. In some cases, the communication interface 218 may be any means such as a device or circuitry embodied in either hardware, or a combination of hardware and software that is configured to receive and/or transmit data from/to a network and/or any other device or module in communication with the processing circuitry 210. In this regard, the communication interface 218 may include, for example, an antenna (or multiple antennas) and supporting hardware and/or software for enabling communications with a wireless communication network and/or a communication modem(s) or other hardware/software for supporting communication via cable, digital subscriber line (DSL), universal serial bus (USB), Ethernet, WLAN, Bluetooth, cellular network, and/or other methods.

In some example embodiments, the communication interface 218 may comprise a plurality of wireless modems. The wireless modems may comprise any wireless modem that may be used for wireless communication, transmission and/or receipt of data wirelessly, receipt of a wireless service, and/or the like. In this regard, examples of such wireless modems may include a cellular modem, a WLAN modem, a Bluetooth transceiver, a Global Positioning System (GPS) or other satellite positioning receiver, a mobile television receiver, a ZigBee modem, a digital broadcast radio receiver, a frequency modulation (FM) radio receiver, a radio frequency identification (RFID) transceiver, and/or the like. At least one of the modems may comprise a connectivity modem, which may be configured to receive and/or transmit data in an unlicensed portion of the radio frequency spectrum, such as in an ISM band. By way of example, a connectivity modem may comprise a WLAN modem, a Bluetooth transceiver, or the like.

The communication interface 218 is illustrated by way of example in FIG. 2 to include two wireless modems, the first wireless modem 220 and the second wireless modem 222. It will be appreciated, however, that the communication interface 218 may include additional modems beyond those illustrated in and described with respect to FIG. 2. While the first wireless modem 220 and second wireless modem 222 may each comprise any type of wireless modem, various example embodiments are described in the context of the second wireless modem 222 being a cellular modem, such as an LTE/LTE-A modem, and the first wireless modem 220 being a modem that receives data in a frequency band that may be affected by interference from a transmission by the second wireless modem 222. As an example, the first wireless modem 220 may use a radio technology other than a cellular communications technology that may be used by the second wireless modem 222, which may be complementary to the cellular communications technology. The first wireless modem 220 may, for example, comprise a connectivity modem. It will be understood, however, that such example embodiments are provided by way of example, and not by way of limitation. In this regard, the scope of the disclosure is not limited to the first wireless modem being embodied as a connectivity modem and/or to the second wireless modem being embodied as a cellular modem. Rather, it will be appreciated that the disclosure is inclusive of any modem configuration wherein a first wireless modem may be informed of a portion of a frequency band(s) used by the first wireless modem that may be affected by interference from a data transmission by the second wireless modem.

The first wireless modem 220 and second wireless modem 222 may be configured to communicate directly or indirectly via an interface (e.g., a bus) between the first wireless modem 220 and second wireless modem 222. In embodiments wherein the interface between the first wireless modem 220 and the second wireless modem 222 is not direct, the interface may include one or more other intermediate elements, such as the processor 212, interference avoidance manager 224, and/or the like.

In some example embodiments, the memory 214 may include one or more non-transitory memory devices such as, for example, volatile and/or non-volatile memory that may be either fixed or removable. The memory 214 may be configured to store information, data, applications, instructions, or the like for enabling the apparatus 202 to carry out various functions in accordance with one or more example embodiments. For example, the memory 214 may be configured to buffer input data for processing by the processor 212. Additionally or alternatively, the memory 214 may be configured to store instructions for execution by the processor 212. As yet another alternative, the memory 214 may include one or more databases that may store a variety of files, contents or data sets. Among the contents of the memory 214, applications may be stored for execution by the processor 212 in order to carry out the functionality associated with each respective application. In some cases, the memory 214 may be in communication with the processor 212 via a bus for passing information among components of the apparatus 202.

The processor 212 may be embodied in a number of different ways. For example, the processor 212 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In some example embodiments, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry—in the form of processing circuitry 210) capable of performing operations according to embodiments of the present invention while configured accordingly. Thus, for example, when the processor 212 is embodied as an ASIC, FPGA or the like, the processor 212 may be specifically configured hardware for conducting the operations described herein. Alternatively, as another example, when the processor 212 is embodied as an executor of software instructions, the instructions may specifically configure the processor 212 to perform one or more operations described herein.

In some example embodiments, the processor 212 (or the processing circuitry 210) may be embodied as, include, or otherwise control an interference avoidance manager 224. As such, the interference avoidance manager 224 may be embodied as various means, such as circuitry, hardware, a computer program product comprising computer readable program instructions stored on a computer readable medium (for example, the memory 214) and executed by a processing device (for example, the processor 212), or some combination thereof. The interference avoidance manager 224 may be capable of communication with one or more of the memory 214, user interface 216, or communication interface 218 to access, receive, and/or send data as may be needed to perform one or more of the functionalities of the interference avoidance manager 224 as described herein.

In some example embodiments, the interference avoidance manager 224 may be integrated into a chip or chipset that may comprise a wireless modem, such as the second wireless modem 222. Accordingly, in such example embodiments, the interference avoidance manager 224 may be aware of and or may be configured to control data transmission by the second wireless modem 222, and may be configured to communicate with the first wireless modem 220 via an interface between the first wireless modem 220 and the second wireless modem 222. In alternative example embodiments, the interference avoidance manager 224 may serve as an intermediary on an interface between two or more wireless modems. Accordingly, in such example embodiments, the interference avoidance manager 224 may be configured to receive data from and send data to both the first wireless modem 220 and the second wireless modem 222.

The interference avoidance manager 224 may be configured to determine that the second wireless modem 222 is going to transmit data. For example, in embodiments wherein the interference avoidance manager 224 is integrated into a chip or chipset comprising the second wireless modem 222, the interference avoidance manager 224 may know or otherwise have access to information about an upcoming transmission by the second wireless modem 222. As another example, in embodiments wherein the interference avoidance manager 224 is embodied separate from the second wireless modem 222, the second wireless modem 222 may be configured to inform the interference avoidance manager 224 of an upcoming transmission. The data transmission may, for example, comprise an uplink transmission in embodiments wherein the second wireless modem 222 is embodied as a cellular modem.

The interference avoidance manager 224 may be further configured to determine a portion(s) of a frequency band used for data reception by the first wireless modem 220 that may be affected by interference from the data transmission by the second wireless modem 222. In order to determine the portion(s) of the frequency band, the interference avoidance manager 224 may, for example, calculate and/or estimate the leakage power into a region(s) of the frequency band (e.g., the ISM band) used for reception by the first wireless modem 220. The interference avoidance manager 224 may, for example, consider any one or more of the following factors to calculate the leakage power:

Knowledge of transmission power for the scheduled transmission

Knowledge of uplink radio bearer (RB) allocation for the scheduled transmission (e.g., modulation, location of used RB, channel coding, and/or the like)

Knowledge of the uplink carrier frequency for the transmission

Knowledge of the radio frequency transmit filter attenuation at different frequencies The interference avoidance manager 224 may compare the calculated leakage power to a predefined dBm (power ratio in decibels (dB) of the monitored power referenced to one milliwatt (mw)) threshold. If leakage power is below the threshold for a given portion of the frequency band used for reception by the first wireless modem 220, the region may be considered usable for reception. If, however, the leakage power is greater than the threshold for a given portion of the frequency band, the interference avoidance manager 224 may determine that the portion may be affected by interference from the data transmission by the second wireless modem 222 and, thus, is blocked for reception.

The dBm threshold may be tunable and may be defined by a manufacturer of the second wireless modem 222, the apparatus 202, or the like. Use of a tunable threshold may, for example, enable accounting for different antenna isolations between the first wireless modem 220 and second wireless modem 222, which may be an attribute of the antenna configuration and physical size of the apparatus 202. As another example, use of a tunable threshold may allow different sensitivity degradations of the first wireless modem 220 to be configured (e.g. 1 dB sensitivity loss, 3 dB sensitivity loss, etc). As still a further example, use of a tunable threshold may allow the threshold to be adjusted to account for a band pass filter that may be used by the second wireless modem 222.

The determined portion(s) of the frequency band used by the first wireless modem 220 may comprise absolute frequencies and/or frequency ranges. For example, the interference avoidance manager 224 may determine the availability/unavailability for reception by the first wireless modem 220 of a series of frequency ranges (e.g., a series of 1 megahertz (MHz) ranges). As another example, the interference avoidance manager 224 may determine the availability/unavailability for reception by the first wireless modem 220 of one or more channel(s) in the frequency band. As an example, in some example embodiments wherein the first wireless modem 220 is embodied as a WLAN modem, the interference avoidance manager 224 may be configured to determine which WLAN channel(s) may be affected by the transmission by the second wireless modem 222. As an example, for a given example transmission by the wireless modem 222, the interference avoidance manager 224 may determine the availability/unavailability of WLAN channels as follows in Table 1:

| WLAN Channel (Frequency, MHz) | Available to connectivity receiver |
|---|---|
| 1 (2412 MHz) | Yes |
| 2 (2417 MHz) | Yes |
| 3 (2422 MHz) | Yes |
| 4 (2427 MHz) | Yes |
| 5 (2432 MHz) | Yes |
| 6(2437 MHz) | Yes |
| 7(2442 MHz) | Yes |
| 8 (2447 MHz) | Yes |
| 9 (2452 MHz) | No |
| 10 (2457 MHz) | No |
| 11 (2462 MHz) | No |
| 12 (2467 MHz) | No |
| 13 (2472 MHz) | No |
| 14 (2484 MHz) | No |

The interference avoidance manager 224 may cause an indication of the determined portion(s) to be provided to the first wireless modem 220. The indication may comprise an indication of portion(s) available for reception (e.g., that are not affected by interference) and/or an indication of portion(s) unavailable for reception (e.g., that are affected by interference). In this regard, the second wireless modem 222 may cause the indication to be provided prior to the data transmission by the second wireless modem 222. In some example embodiments wherein the interference avoidance manager 224 is integrated into a chip or chipset comprising the second wireless modem 222, the indication may be provided to the first wireless modem 220 via an interface between the first wireless modem 220 and the second wireless modem 222.

The indication of the determined portion of the frequency band may comprise any appropriate indication that may be understood by the first wireless modem 220. For example, if the determined portion(s) comprise determined channels, the indication may comprise a bitmap indicating the available/unavailable channels. Using the example from Table 1, the indication may represent each channel as a single bit in the 14 bit bitmap 00000000111111, indicating that WLAN channels 1 to 8 have transmitter leakage below the threshold, while channels 9 to 14 have leakage above the threshold and are unavailable for use. Similarly, if the interference avoidance manager 224 determines the availability/unavailability of a series of frequency ranges in the frequency band used by the first wireless modem 220, the indication may comprise a bitmap having a bit for each frequency range.

Alternatively, the indication may comprise an index to the lowest and/or highest unavailable channel or frequency range, the lowest and/or highest available channel or frequency range, or the like. For the example, using the example of Table 1, an indication of the lowest unavailable WLAN channel (9) and/or the highest available WLAN channel (8) may be provided to the first wireless modem 220.

As still a further example, the indication may comprise a list of frequencies and/or frequency ranges and corresponding interference levels caused by transmission of the second wireless modem on those frequencies.

The first wireless modem 220 may take action to adapt a data reception, such as through the use of flow control, to avoid interference from the transmission by the second wireless modem 222 based at least in part on the received indication. As one example, the first wireless modem 220 may delay a data reception until after the transmission by the second wireless modem 222. As another example, the first wireless modem 220 may confine reception during the transmission by the second wireless modem 222 to a portion of the frequency band that is unaffected by the transmission. If the indication of the affected portion(s) of the frequency bands comprises an indication of availability/unavailability of frequency ranges (e.g., 1 MHz frequency ranges) smaller than a channel size, the first wireless modem 220 may still use an unaffected portion of an affected channel for reception. Further, if WLAN channel numbering is used to provide an indication of available/unavailable WLAN channels, even if the first wireless modem 220 is not a WLAN modem, the first wireless modem 220 may use WLAN channel numbering as a basis to determine a portion(s) of the frequency band that is available/unavailable for data reception. In this regard, the first wireless modem 220 may determine the frequency range corresponding to a respective WLAN channel.

In some example embodiments, the first wireless modem 220 may inform the interference avoidance manager 224 of a future reception window. The future reception window may, for example, comprise an upcoming high priority reception. The first wireless modem 220 may indicate a frequency or frequency range on which the future reception will occur. The interference avoidance manager 224 may use an indicated future reception window as a constraint in determining a portion(s) of the frequency band used by the first wireless modem 220 that may be affected by a transmission by the second wireless modem 222. In this regard, the frequency/frequency range that will be used by the first wireless modem 220 for the reception window may impose a constraint on a portion of the frequency band used by the first wireless modem 220 that should have leakage power below the configured threshold.

For example, using the example of Table 1, the first wireless modem 220 may indicate that a 1 millisecond reception window on WLAN channel 9 will occur in 10 milliseconds. In the example of Table 1, the interference avoidance manager 224 determined that WLAN channel 9 may be affected by a transmission of the second wireless modem 222 and was unavailable to the first wireless modem 220 during the transmission by the second wireless modem 222. As the transmission is now constrained by the reception window of the first wireless modem 220 in the current example, the interference avoidance manager 224 may instead determine the following channel availability as follows in Table 2:

| WLAN Channel (Frequency, MHz) | Available to connectivity receiver |
|---|---|
| 1 (2412 MHz) | Yes |
| 2 (2417 MHz) | Yes |
| 3 (2422 MHz) | Yes |
| 4 (2427 MHz) | Yes |
| 5 (2432 MHz) | Yes |
| 6(2437 MHz) | Yes |
| 7(2442 MHz) | Yes |
| 8 (2447 MHz) | Yes |
| 9 (2452 MHz) | Yes |
| 10 (2457 MHz) | No |
| 11 (2462 MHz) | No |
| 12 (2467 MHz) | No |
| 13 (2472 MHz) | No |
| 14 (2484 MHz) | No |

The interference avoidance manager 224 may accordingly, if necessary, cause a quality of the data transmission by the second wireless modem 220 to be adjusted to accommodate the reception window of the first wireless modem 220. In embodiments wherein the interference avoidance manager 224 is embodied separate from the second wireless modem 222, the interference avoidance manager 224 may inform the second wireless modem 222 of the need to adjust the data transmission to accommodate the reception window. Alternatively, in embodiments wherein the interference avoidance manager 224 is integrated into a chip or chipset comprising the second wireless modem 222, the interference avoidance manager 224 may be configured to control transmission by the second wireless modem 222. It will be appreciated that any appropriate quality(ies) of the data transmission may be adjusted to accommodate the reception window. As an example, a transmission power used by the second wireless modem 222 may be reduced. As another example, if the second wireless modem 222 comprises a cellular modem, the second wireless modem 222 may omit some portion of allocated resource blocks by not using transmission power on those to ensure that leakage will not interfere with the reception window of the first wireless modem 220.

Referring now to FIG. 3, FIG. 3 illustrates a flowchart according to an example method for facilitating avoidance of in-device interference according to some example embodiments. In this regard, FIG. 3 illustrates operations that may be performed at the apparatus 202. The operations illustrated in and described with respect to FIG. 3 may, for example, be performed by, with the assistance of, and/or under the control of one or more of the processing circuitry 210, processor 212, memory 214, communication interface 218, first wireless modem 220, second wireless modem 222, or interference avoidance manager 224. Operation 300 may comprise determining a portion of a frequency band used for data reception by a first wireless modem that may be affected by interference from a data transmission by a second wireless modem. The processing circuitry 210, processor 212, memory 214, communication interface 218, first wireless modem 220, second wireless modem 222, and/or interference avoidance manager 224 may, for example provide means for performing operation 300. Operation 310 may comprise causing an indication of the determined portion of the frequency band to be provided to the first wireless modem. The processing circuitry 210, processor 212, memory 214, communication interface 218, first wireless modem 220, second wireless modem 222, and/or interference avoidance manager 224 may, for example provide means for performing operation 310.

Referring now to FIG. 4, FIG. 4 illustrates a flowchart according to another example method for facilitating avoidance of in-device interference according to some example embodiments. In this regard, FIG. 4 illustrates operations that may be performed at the apparatus 202. The operations illustrated in and described with respect to FIG. 4 may, for example, be performed by, with the assistance of, and/or under the control of one or more of the processing circuitry 210, processor 212, memory 214, communication interface 218, first wireless modem 220, second wireless modem 222, or interference avoidance manager 224. Operation 400 may comprise calculating a leakage power into a frequency band used for data reception by a first wireless modem that may result from a data transmission by a second wireless modem. The processing circuitry 210, processor 212, memory 214, communication interface 218, second wireless modem 222, and/or interference avoidance manager 224 may, for example provide means for performing operation 400. Operation 410 may comprise determining, based at least in part on the calculated leakage power, a portion of the frequency band that may be affected by interference from the data transmission. The processing circuitry 210, processor 212, memory 214, communication interface 218, second wireless modem 222, and/or interference avoidance manager 224 may, for example provide means for performing operation 410. Operation 420 may comprise causing an indication of the determined portion of the frequency band to be provided to the first wireless modem. The processing circuitry 210, processor 212, memory 214, communication interface 218, first wireless modem 220, second wireless modem 222, and/or interference avoidance manager 224 may, for example provide means for performing operation 420.

Referring now to FIG. 5, FIG. 5 illustrates a flowchart according to a further example method for facilitating avoidance of in-device interference according to some example embodiments. In this regard, FIG. 5 illustrates operations that may be performed at the apparatus 202. The operations illustrated in and described with respect to FIG. 4 may, for example, be performed by, with the assistance of, and/or under the control of one or more of the processing circuitry 210, processor 212, memory 214, communication interface 218, first wireless modem 220, second wireless modem 222, or interference avoidance manager 224. Operation 500 may comprise receiving an indication of a future reception window from a first wireless modem. The processing circuitry 210, processor 212, memory 214, communication interface 218, first wireless modem 220, second wireless modem 222, and/or interference avoidance manager 224 may, for example provide means for performing operation 500. Operation 510 may comprise causing a quality of a data transmission by a second wireless modem to be adjusted to accommodate the reception window. The processing circuitry 210, processor 212, memory 214, communication interface 218, second wireless modem 222, and/or interference avoidance manager 224 may, for example provide means for performing operation 510. Operation 520 may comprise determining, based at least in part on the indication of the future reception window, a portion of a frequency band used for data reception by the first wireless modem that may be affected by interference from the data transmission by the second wireless modem. The processing circuitry 210, processor 212, memory 214, communication interface 218, second wireless modem 222, and/or interference avoidance manager 224 may, for example provide means for performing operation 520. It will be appreciated that operations 510 and 520 may be performed in any order, and are not limited to being performed in the order illustrated in FIG. 5. Operation 530 may comprise causing an indication of the determined portion of the frequency band to be provided to the first wireless modem. The processing circuitry 210, processor 212, memory 214, communication interface 218, first wireless modem 220, second wireless modem 222, and/or interference avoidance manager 224 may, for example provide means for performing operation 530.

FIGS. 3-5 are flowcharts of a system, method and program product according to example embodiments of the invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts block(s). These computer program instructions may also be stored in a non-transitory computer-readable storage memory that may direct a computer or other programmable apparatus to function in a particular manner, such that the instructions stored in the computer-readable storage memory produce an article of manufacture the execution of which implements the function specified in the flowcharts block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts block(s).

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   determining, by processing circuitry, estimated leakage power into a portion of a frequency band used for data reception by a first wireless modem, the estimated leakage power resulting from a data transmission by a second wireless modem;
   determining that the estimated leakage power into the portion renders the portion unusable for data reception by the first wireless modem; and
   in response to the determining, causing an indication of the portion of the frequency band that is determined to be unusable for data reception to be provided to the first wireless modem.

2. The method of claim 1, wherein causing the indication of the portion of the frequency band to be provided comprises causing the indication of the portion of the frequency band to be provided to the first wireless modem prior to the data transmission by the second wireless modem.

3. The method of claim 1, wherein causing the indication of the portion of the frequency band to be provided comprises causing the indication of the portion of the frequency band to be provided to the first wireless modem via an interface between the first wireless modem and the second wireless modem.

4. The method of claim 1, wherein the first wireless modem and the second wireless modem are embodied on a single computing device.

5. The method of claim 1, wherein the second wireless modem comprises a cellular modem.

6. The method of claim 1, wherein the first wireless modem comprises a modem configured to receive data in an unlicensed frequency band.

7. The method of claim 1, wherein the estimated leakage power is determined based on at least one of:
   transmission power for a scheduled transmission of the second wireless modem;
   uplink radio bearer allocation for a scheduled transmission of the second wireless modem;
   uplink carrier frequency for a scheduled transmission of the second wireless modem; and
   radio frequency transmit filter attenuation at different frequencies of the second wireless modem.

8. A method comprising:
   receiving an indication of a future reception window from a first wireless modem,
   determining, by processing circuitry and based at least in part on the received indication, a portion of a frequency band used for data reception by the first wireless modem that is estimated to be affected by interference from a data transmission by a second wireless modem; and causing an indication of the determined portion of the frequency band to be provided to the first wireless modem.

9. The method of claim 8, further comprising causing a quality of the data transmission by the second wireless modem to be adjusted to accommodate the reception window based at least in part on the received indication.

10. An apparatus comprising:
at least one processor; and at least one memory including computer program code, wherein the at least one memory and the computer program code are configured to, with the at least one processor, cause the apparatus at least to:
determine estimated leakage power into a portion of a frequency band used for data reception by a first wireless modem, the estimated leakage power resulting from a data transmission by a second wireless modem;
determine that the estimated leakage power into the portion renders the portion unusable for data reception by the first wireless modem; and
in response to determining, cause an indication of the portion of the frequency band that is determined to be unusable for data reception to be provided to the first wireless modem.

11. The apparatus of claim 10, wherein causing the indication of the portion of the frequency band to be provided comprises causing the indication of the portion of the frequency band to be provided to the first wireless modem prior to the data transmission by the second wireless modem.

12. The apparatus of claim 10, wherein causing the indication of the portion of the frequency band to be provided comprises causing the indication of the portion of the frequency band to be provided to the first wireless modem via an interface between the first wireless modem and the second wireless modem.

13. The apparatus of claim 10, wherein the first wireless modem and the second wireless modem are embodied on a single computing device.

14. The apparatus of claim 10, wherein the second wireless modem comprises a cellular modem.

15. The apparatus of claim 14, wherein the first wireless modem comprises a modem configured to receive data in an unlicensed frequency band.

16. The apparatus of claim 10, wherein:
the portion of the frequency band comprises one or more channels in the frequency band; and causing the indication of the portion of the frequency band that is determined to be unusable for data reception to be provided to the first wireless modem comprises causing an indication of the one or more channels that is determined to be unusable for data reception to be provided to the first wireless modem.

17. The apparatus of claim 10, wherein the apparatus comprises or is embodied on a mobile computing device.

18. An apparatus comprising: at least one processor; and at least one memory including computer program code, wherein the at least one memory and the computer program code are configured to, with the at least one processor, cause the apparatus to:
receive an indication of a future reception window from a first wireless modem;
determine, based at least in part on the received indication, a portion of a frequency band used for data reception by the first wireless modem that is estimated to be affected by interference from a data transmission by a second wireless modem; and
cause an indication of the determined portion of the frequency band to be provided to the first wireless modem.

19. The apparatus of claim 18, wherein the at least one memory and the computer program code configured to, with the at least one processor, further cause the apparatus to:
cause a quality of the data transmission by the second wireless modem to be adjusted to accommodate the reception window based at least in part on the received indication.

20. A non-transitory computer-readable storage medium comprising computer program code instructions stored therein, the computer program code instructions comprising:
program code instructions configured to determine estimated leakage power into a portion of a frequency band used for data reception by a first wireless modem, the estimated leakage power resulting from a data transmission by a second wireless modem;
program code instructions configured to determine that the estimated leakage power into the portion renders the portion unusable for data reception by the first wireless device; and
in response to the determining, program code instructions configured to cause an indication of the portion of the frequency band that is determined to be unusable for data reception to be provided to the first wireless modem.

* * * * *